J. C. TALLMAN.
Corset.
No. 226,806.
Patented April 20, 1880.
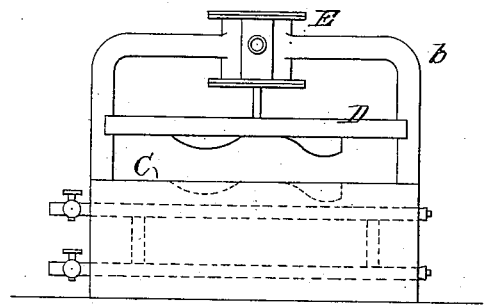
Attest:
Courtney A. Cooper
William Paxton
Inventor:
John C. Tallman
By his attorney
Charles E. Foster

UNITED STATES PATENT OFFICE.

JOHN C. TALLMAN, OF NEW YORK, N. Y., ASSIGNOR TO L. C. WARNER, OF SAME PLACE.

CORSET.

SPECIFICATION forming part of Letters Patent No. 226,806, dated April 20, 1880.

Application filed October 13, 1879.

*To all whom it may concern:*

Be it known that I, JOHN C. TALLMAN, of the city, county, and State of New York, have invented an Improvement in the Manufacture of Corsets, of which the following is a specification.

My invention is an improvement in the manufacture of corsets, bosom-pads, and other articles composed in whole or in part of what is known as "tampico" and similar grasses, whereby the elasticity and durability of the article are greatly increased.

In the manufacture of corsets and bosom-pads or "dress forms," I have heretofore employed what is known as "tampico," a grass or vegetable stalk possessing considerable stiffness and flexibility, and generally woven with threads to form a fabric, which I have used either to form the body of the corset or other article, or as a stiffening material, as described in various Letters Patent heretofore granted to me.

In using said material I discovered that its elasticity and durability were greatly increased by subjecting it to heat and pressure, and that when molded under heat and pressure the fibers would retain the shape thus imparted. Thus the fibers of tampico, which in their natural state will break if bent short or under constant use, will, when treated as aforesaid, become what I term "tempered"—that is, they will become extremely elastic, and are toughened and strengthened, so that no ordinary usage will impair their quality.

In the manufacture of the desired articles different modes of treating the material may be adopted. For instance, the sections of tampico fabric necessary to make up the desired article may be treated either prior to or after securing them together, and different apparatus may be used in the manufacture.

A machine which I have found most effective is shown in the accompanying drawings, the same consisting of a powerful press having the male die D, female die C, and a pressure device, E, that represented being a hydraulic press carried by a yoke, *b*, attached to the lower die, C.

The faces of the dies conform to that of the article to be made. One of the dies is heated by steam or otherwise, and the two, when brought upon the article between them, subject the same to such heat and pressure as to mold and set the fibers as well as the "bones" in the article and temper the tampico.

Without limiting myself to any form of apparatus, I claim—

As a new article of manufacture, a corset or bosom-pad made in whole or in part of tempered tampico, substantially as set forth.

In testimony whereof I have signed my name to this specification in the presence of two subscribing witnesses.

JOHN C. TALLMAN.

Witnesses:
CHARLES E. FOSTER,
OTIS F. PRESBREY.